United States Patent [19]
Roy et al.

[11] Patent Number: 5,124,519
[45] Date of Patent: Jun. 23, 1992

[54] ABSORBENT MICROWAVE SUSCEPTOR COMPOSITE AND RELATED METHOD OF MANUFACTURE

[75] Inventors: Robin Roy, Hamilton Square, N.J.; Stephen P. Lengyel, Medfield, Mass.

[73] Assignee: International Paper Company, Purchase, N.Y.

[21] Appl. No.: 468,657

[22] Filed: Jan. 23, 1990

[51] Int. Cl.⁵ .............................. B23K 15/10
[52] U.S. Cl. ............... 219/10.55 E; 219/10.55 F; 219/10.55 R; 99/DIG. 14; 426/107; 426/113; 428/34; 428/35.1
[58] Field of Search ............... 219/10.55 E, 10.55 F, 219/10.55 K, 10.55 M, 10.55 R, 10.55 D; 426/107, 113, 234, 243; 99/DIG. 14; 428/34, 35

[56] References Cited

U.S. PATENT DOCUMENTS

| | | | |
|---|---|---|---|
| 3,038,811 | 6/1962 | Reading | 99/171 |
| 3,185,372 | 5/1965 | Ferraro | 229/3.5 |
| 3,322,319 | 5/1967 | Sweeney et al. | 229/3.5 |
| 3,411,433 | 11/1968 | Christopher | 99/446 |
| 3,415,662 | 12/1968 | Koger et al. | 99/171 |
| 3,515,331 | 6/1970 | Guthrie, Sr. | 229/14 |
| 3,619,215 | 11/1971 | Bard et al. | 99/174 |
| 3,640,209 | 2/1972 | Wilson | 99/446 |
| 3,916,030 | 10/1975 | Bard et al. | 426/113 |
| 3,962,961 | 6/1976 | Peters | 99/426 |
| 4,015,085 | 3/1977 | Woods | 219/10.55 E |
| 4,267,420 | 5/1981 | Brastad | 219/10.55 E |
| 4,268,738 | 5/1981 | Flautt, Jr. et al. | 219/10.55 E |
| 4,275,811 | 6/1981 | Miller | 206/204 |
| 4,321,997 | 3/1982 | Miller | 206/204 |
| 4,390,554 | 6/1983 | Levinson | 426/232 |
| 4,410,578 | 10/1983 | Miller | 428/117 |
| 4,579,223 | 4/1986 | Otsuka et al. | 206/204 |
| 4,619,361 | 10/1986 | Thomas, Jr. | 206/204 |
| 4,641,005 | 2/1987 | Seiferth | 219/10.55 E |
| 4,657,133 | 4/1987 | Komatsu et al. | 206/204 |
| 4,703,148 | 10/1987 | Mikulski et al. | 219/10.55 E |
| 4,713,510 | 12/1987 | Quick et al. | 219/10.55 E |
| 4,720,410 | 1/1988 | Lundquist et al. | 428/136 |
| 4,735,513 | 4/1988 | Watkins et al. | 383/116 |
| 4,756,939 | 7/1988 | Goodwin | 428/74 |
| 4,786,513 | 11/1988 | Monforton et al. | 426/107 |
| 4,802,574 | 2/1989 | Akiba | 206/204 |
| 4,815,590 | 3/1989 | Peppiatt et al. | 206/204 |
| 4,832,507 | 5/1983 | Miller | 206/204 |
| 4,851,632 | 7/1989 | Kaliski | 219/10.55 E |
| 4,933,526 | 6/1990 | Fisher et al. | 219/10.55 M |
| 4,962,000 | 10/1990 | Emslander et al. | 428/461 |
| 4,985,606 | 1/1991 | Faller | 219/10.55 |

OTHER PUBLICATIONS

"Heat of the Moment", *Packaging Week*, Sep. 14, 1988, pp. 13, 14 & 17.
"Microwave Packet Broils Bacon Cleanly", *Packaging Technology*, Jul. 1988.
"Why the Heat-and-Eat Market is Really Cooking", *Business Week*, Jun. 27, 1988.

*Primary Examiner*—Bruce A. Reynolds
*Assistant Examiner*—Tu Hoang
*Attorney, Agent, or Firm*—Walt Thomas Zielinski

[57] ABSTRACT

A microwave susceptor composite which includes a first layer of polymeric fibrous material, and a second layer of thermoplastic polymer material having microwave susceptive characteristics. The polymeric susceptor and polymeric fibrous material layers are arranged in lamina surface-to-surface contact and bonded into an integral structure by application of heat and pressure. A uniform composite material is obtained by carding the polymeric fibrous materials prior to bonding the first and second layers. In microwave cooking applications the fibrous layer of the composite absorbs excess effluents from the food product. Browning and crisping of food products is effected by microwave excitation of the metallized second layer of the composite.

32 Claims, 4 Drawing Sheets

ABSORBENT MICROWAVE SUSCEPTOR COMPOSITE AND RELATED METHOD OF MANUFACTURE

DESCRIPTION

1. Field of Invention

This invention generally relates to disposable microwave susceptor materials useful in the packaging and cooking of food items. More particularly, it is concerned with a metallized film susceptor material which browns and crisps, and also absorbs excess grease, fats and moisture in microwave cooking applications.

2. Background Art

In order to effectively brown and crisp food products it is necessary to impart surface temperatures to food products in range of 250°–600° F. which are characteristic of conventional radiant heat sources. Conventional high frequency microwave energy sources are ineffective for brown and crisp cooking applications in that long wavelength energy of such sources impart surface temperatures to foods of approximately 200° F.

Microwave susceptor materials are known which impart radiant oven surface temperature levels to food surfaces in the presence of microwave energy. Such susceptor heating materials have found wide application in providing disposable ovenable food containers. Microwave interactive susceptor materials which include metallized film components are employed to obtain controlled heat profiles for cooking applications.

Conventional susceptor materials are fabricated by depositing a film of conductive elemental metal on a non-interactive or microwave transparent supporting substrate, which may be a biax oriented polyester film, by a process of vacuum vapor deposition. See U.S. Pat. Nos. 4,641,005 to Seiferth and 4,267,420 to Brastad. Such metallized substrates are adhesive laminated to paper, paperboard or other rigid materials to provide microwave interactive disposable food packaging.

The art has recognized that the quality of microwaved foods cooked in conventional susceptor material packaging is not entirely satisfactory in that the susceptor materials do not adequately absorb excess grease and oil from food products during cooking. Further difficulties are presented by migration into food products of adhesives employed in the manufacture of susceptor material laminates.

To overcome these difficulties the art has proposed the use of nonwoven materials as grease absorbing element in microwave food packaging. *Business Week* and *Packaging Technology*, respectively, in their June and July, 1988 publications report the introduction of packaging by Wright Brand Foods Inc. and Geo. A. Hormel & Co. developed by 3M Corp. for browning bacon. The package includes an expandable plastic bag and absorbent MICROINSORB 3M nonwoven pad. Steam generated during cooking of the bacon is contained in the bag to limit evaporative cooling. A high temperature and crisping is effected by the microwave excitation of bacon grease in the package. It is asserted that the nonwoven MICROINSORB pad also absorbs grease to provide a quality product.

The *Business Week* article reports that the product has limited application in browning food products—steam is not an appropriate medium for browning food products and most foods do not have the high grease content of bacon. Moreover, it is desirable to provide a packaging material which has application for cooking of packaged and non-prepackaged foods.

The art has not provided a disposable microwave interactive material with satisfactory grease and moisture absorption characteristics. It will be appreciated that advantage would be obtained in a microwave interactive material with grease and fat absorption characteristics. There is a need for such a susceptor material which has application in ovenable packages and as a cooking wrap for non-prepackaged food products.

Accordingly, it is a broad object of the invention to provide an improved grease and moisture absorbent susceptor material for microwave cooking of diverse food products.

A more specific object of the invention is to provide a microwave susceptor material including grease absorbent characteristics which effects uniform browning and crisping of food products.

Another object of the invention is to provide low cost disposable food packaging which incorporates the absorbent susceptor material of the invention.

A further object of the invention is to provide a method for laminating microwave susceptor component materials which is less complex and improved over the prior art.

DISCLOSURE OF THE INVENTION

In the present invention, these purposes, as well as others which will be apparent, are achieved generally by providing a microwave composite thermoplastic material which includes a first layer of absorbent polymeric fibrous material, and a second layer of polymeric susceptor material which has outer metallized susceptor and film surfaces. The absorbent layer is arranged in lamina surface-to-surface contact with the film or metallized surfaces of the susceptor layer, and bonded into an integral composite structure by application of heat and pressure.

Fibrous materials employed in the microwave composite are selected from group of absorbent thermoplastic polymeric materials such as polyester, polypropylene, and blends thereof with rayon, cotton and other absorbent non-thermoplastic fibers. The polymeric susceptor layer of the composite may include conventional metallized films. For example, 48 or 92 gauge susceptor films having optical densities in the range of 0.15 to 0.32. Gauge is a term commonly used in the industry to mean film thickness, and refers to the number of mils, or thousandths of an inch. Thus, 48 gauge means 0.48 mils thickness. Optical density is a term used in the industry to mean the fraction of white light that can pass through a film, and is measured as the log(1/fraction of light). thus, an optical density of 0.20 is equal to 63% light transmission, i.e. log (1/0.63). A uniform composite susceptor material is obtained by carding the fibrous materials prior to bonding the first and second layers.

In a preferred composite of the invention, the absorbent layer is bonded to the film surface of the susceptor layer. The absorbent layer in this embodiment is employed as a food support and functions to absorb excess effluents from the food product. Browning and crisping of food products is effected by heating of the metallized second layer of the composite and of grease retained in the fibrous layer. A preferred composite material of the invention is provided with a patterned surface configuration which is aesthetically pleasing and enhances grease and moisture absorption.

In an alternative embodiment of the invention, the absorbent layer is bonded to the metallized surface of the susceptor layer. The film surface in this composite, which is provided with perforations, is employed as the food support and cooking surface. Grease and effluents from food products wick through the perforations and are absorbed in the fibrous layer.

In a preferred packaging application of the invention, a conventional food carton is provided with an interior surface lining of the microwave composite. This combination provides a disposable food package which may be used for microwave cooking. In an alternative packaging embodiment a die cut plastic food tray is provided with panels fabricated of the microwave composite. The microwave composite tray is advantageously employed in combination with a carton to provide a disposable ovenable package and cooking tray.

According to the method of the invention, webs of the first and second component layers of the composite are joined into an integral structure by application of heat and pressure. Bonding of the composite material is preferably effected by passing webs of the first and second layers through thermal calendering rolls at nip temperature and pressures sufficient to bond the thermoplastic fibers and film together. These conditions vary depending on the specific thermoplastic materials. A uniform array of discrete bond areas may be imparted to the composite by employing a patterned calendering roll.

Other objects, features and advantages of the present invention will be apparent when the detailed description of the preferred embodiments of the invention are considered in conjunction with the drawings which should be construed in an illustrative and not limiting sense as follows:

BEST MODE OF CARRYING OUT THE INVENTION

Figure 1:
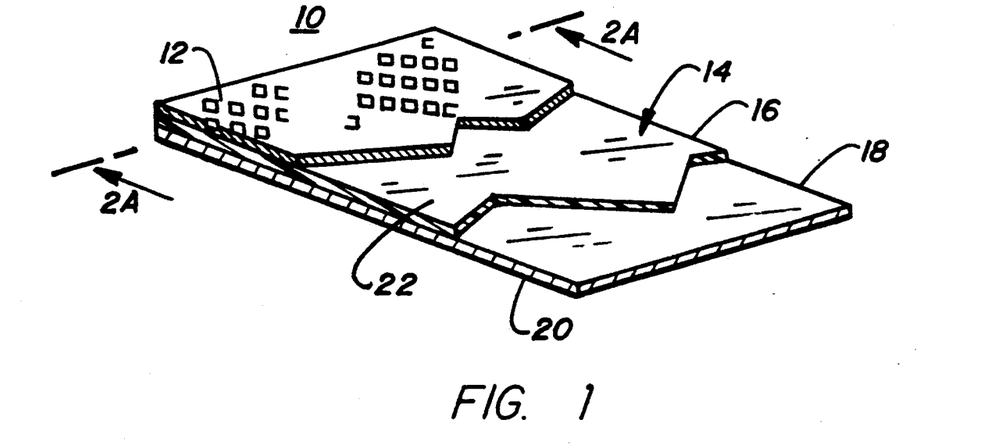
FIG. 1 is a perspective view, with portions broken away, of an absorbent microwave susceptor composite material of the invention which includes susceptor and fibrous nonwoven component layers.

With further reference to the drawings, FIG. 1 illustrates an absorbent microwave susceptor composite material, generally designated 10, in accordance with the invention. The susceptor material includes a first layer of thermoplastic polymeric fibrous material 12, and a second layer of a thermoplastic polymeric susceptor material 14 which has susceptor characteristics.

Fibrous materials employed in the composite are absorbent and have softening temperatures which facilitate bonding of the composite by conventional techniques. Preferred polymeric materials employed in the composite are selected from the group consisting of polyester, polypropylene, and nylon which have softening temperatures and basis weights, respectively, in the range of 250° F. to 500° F., and 30 to 100 grams/yd$^2$. To enhance material absorbency, the polymeric fibers may be blended with non-thermoplastic absorbent fibers such as rayon and cotton. In the preferred embodiment of the invention the fibrous layer 12 includes a carded web of polyester (PET) fiber having a basis weight of 60 grams per square yard. Preferred PET fibers for use in the invention composite have approximate lengths in the range of 1 to 3 inches and deniers of 1 to 6. Denier is a term commonly used in the fiber and textile industry to describe the relative thickness of fibers. It is numerically equal to the weight in grams of 9000 meters of fibers. Table I lists the specifications of representative fiber types which may be used in the invention composite.

TABLE I

| Fiber Type | Brand Designation | Length | Denier |
|---|---|---|---|
| Polyester | T-224, T-259 | 1–3" | 1.5–6 |
| Supplier: | Hoechst Celanese Corporation Charlotte, North Carolina | | |
| Polyester | T-371, T-106 | 1–3" | 1.2–6 |
| Supplier: | E. I. Du Pont de Nemours and Company Wilmington, Delaware | | |
| Rayon | 18247 | 1–3" | 1.5–6 |
| Supplier: | Courtaulds Fibers Inc. Mobile, Alabama | | |
| Polypropylene | T-181, 185 | 1–3" | 2.2–6 |
| Supplier: | Hercules Incorporated Wilmington, Delaware | | |
| Nylon | T-101, T-201, P-113 and P-105 | 1–3" | 1.2–6 |
| Supplier: | E. I. Du Pont de Nemours and Company | | |

It will be understood that the word absorbent in the context of this invention refers to the capacity of the composite to absorb fluids in interstitial spaces of a porous fiber web by capillary action as well as the imbibing of such fluids within the web fibers.

Figure 2A:
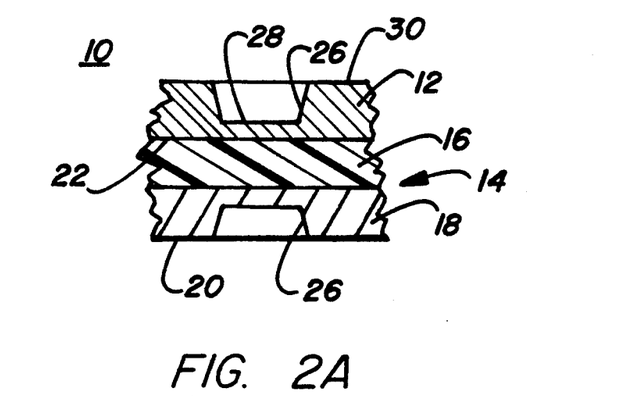
FIG. 2A is a sectional view taken along the line 2A—2A of FIG. 1.

The second polymeric susceptor layer 14 includes a non-microwave interactive support or film substrate 16 which is coated with a susceptor stratum 18 which is preferably an elemental metal. As shown best shown in FIG. 2A, the susceptor layer 14 includes outer susceptor and non-microwave film surfaces 20, 22. The fibrous and susceptor layers 12, 14 are arranged in lamina surface-to-surface contact and bonded into an integral structure by application of heat and pressure. In cooking applications of the composite microwave material, food items are supported on the absorbent fibrous layer 12 which absorbs effluents —grease and moisture—from the food during cooking. Susceptor layer 14 browns and crisps food by increasing the surface temperature of the fibrous layer 12 during microwave excitation.

Figure 2B:
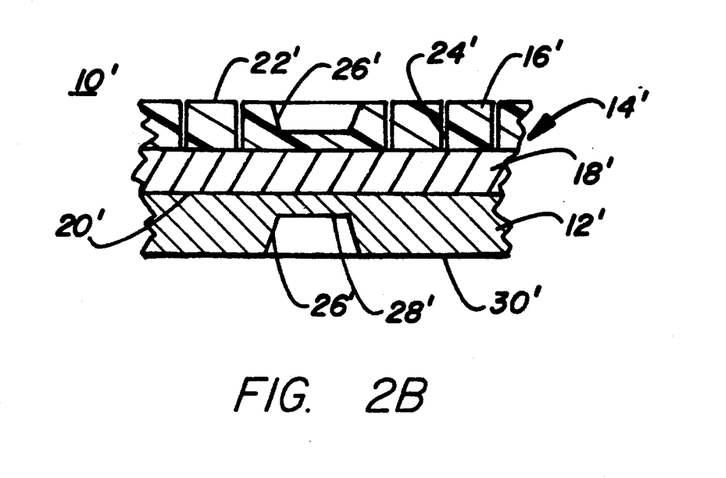
FIG. 2B is a sectional view of an alternative microwave composite material of the invention, similar to FIG. 2A, wherein a susceptor film layer includes perforations.

FIG. 2B, is a cross-sectional view of alternative embodiment of the invention, designated 10', including fibrous and susceptor layers 12', 14''. Susceptor layer 14' includes film and susceptor strata 16', 18' and outer susceptor and film surfaces 20', 22'. This composite differs from the arrangement of FIG. 2A in that the fibrous layer 12' is arranged in lamina contact with the outer susceptor surface 20'. Film surface 22', which is employed as cooking surface, includes a uniform array of perforations 24' which effect absorption of effluents into fibrous layer 12'. Advantageously, the perforations 24' also permit water vapor in the food items to escape limiting vapor condensation on cooked food. Vapor release is of particular importance in applications of the composite in which food items are wrapped or sealed within the composite material.

Conventional metallized film susceptor materials are employed in the invention composite. The susceptor layer 14 is preferably fabricated of susceptor material having a gauge and optical density properties, respectively, in the range of 48 to 96, and 0.20 to 0.25. A preferred susceptor for use in the invention is offered by Web Technologies Inc., Oakville, Conn., under the product designation MICROLITE. This susceptor film is a 48 or 96 gauge biaxially oriented polyethylene terephthalate (PET) metallized with aluminum metal to an optical density in the range of 0.20 to 0.25. Table II sets forth specifications of representative and preferred susceptor materials which may be employed in the present invention.

TABLE II

Susceptor Material Specifications

| Film Substrate | Brand Designation | Thickness (mil) | Film OD |
| --- | --- | --- | --- |
| PET | CD-W60 | .48-.92 | .20-.25 |
| Supplier: | Madico, Inc. Woburn, MA | | |
| PET | MICROLITE | .48-.96 | .20-.25 |
| Supplier: | Web Technologies Inc. Oakville, CT | | |

Metallized susceptor films are conventionally fabricated by a process of vacuum vapor deposition or sputtering of elemental metals, including aluminum and stainless steel onto support members. See U.S. Pat. Nos. 4,267,420 to Brastad and 4,641,005 to Seiferth. It has been found that the materials set forth in Table II interact with microwave energy to generate temperatures necessary to effectively brown and crisp food in conventional microwave ovens. Typically, preferred results are obtained at food surface cooking temperatures in the range of 300° to 500° F. Microwave heat profiles in metallized films are obtained by varying metal content in microwave susceptor materials. Susceptor characteristics are measured with reference to surface resistance, optical density, and temperature profiles in the metallized materials.

As will be discussed more fully hereinafter, fibrous and susceptor layers 12, 14 are integrated into a composite structure by conventional thermal bonding techniques. Application of uniform pressure at temperatures, respectively, in the range of 2100–21,000 psi, at temperatures in the range of 330° F. to 490° F. soften or melt the thermoplastic fibers and film to effect bonding of the composite layers. Preferred pressures and temperature levels are, respectively, 4000–10,000 psi, and 410°–460° F. Thermal calendering is the preferred bonding process for use in the invention.

Advantage is obtained in the invention by imparting a patterned surface configuration to the composite. A preferred composite of the invention is provided with a uniform surface pattern of diamond indentations 26, 26'. See FIGS. 2A and B. The indentations are imparted to the composite in a uniform pattern of discrete bond regions by thermal calender rolls provided with an engraved grid. See FIGS. 3A and 3B. Discrete bond regions having a density in the range of 30 to 400 and preferably 50 to 70 spot bonds per square inch yield a cohesive susceptor composite. Preferred results are obtained at a density of approximately 59 spot bonds per square inch corresponding to 25% of the surface area of the material.

Further advantage in cooking applications is obtained by the diamond patterned surface configuration 26, 26' of the composite. Use of patterned composite provides bonded and non-bonded areas 28, 30; 28', 30, in the fibrous layer 12, 12'. Non-bonded areas 30, 30' provide a grease absorption and wicking feature in the composite.

It will be appreciated that the microwave composite material of the invention may be provided in sheets or roll form for use in diverse restaurant and home use applications. FIGS. 4–7 illustrate packaging applications of the composite.

Figure 4:
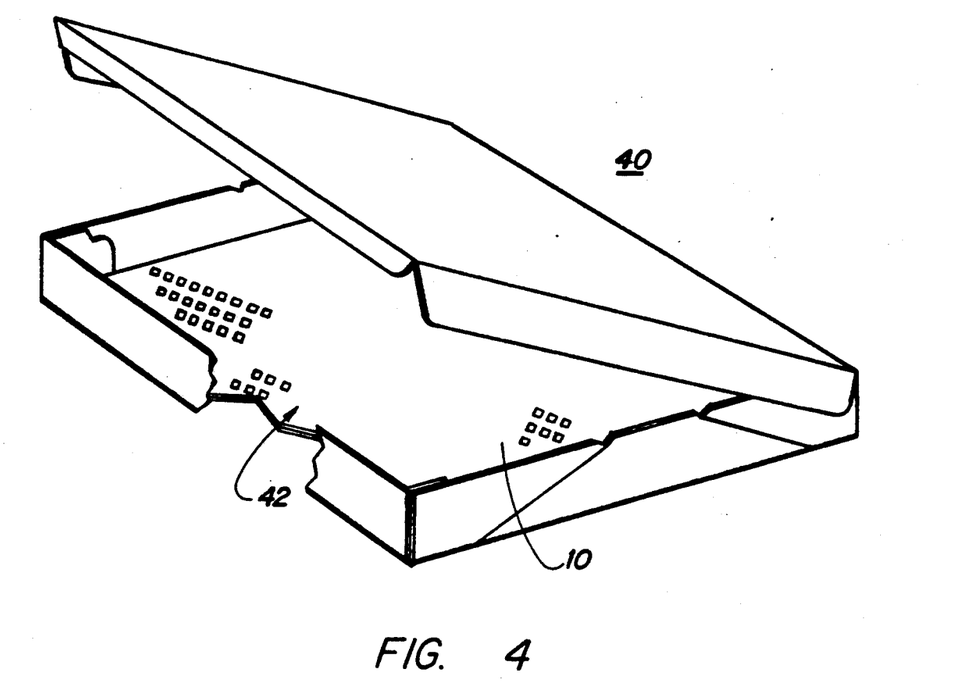
FIG. 4 is a perspective view of a disposable microwave carton in accordance with the invention, wherein the susceptor material of FIG. 1 is disposed over an interior carton panel.
Figure 5:
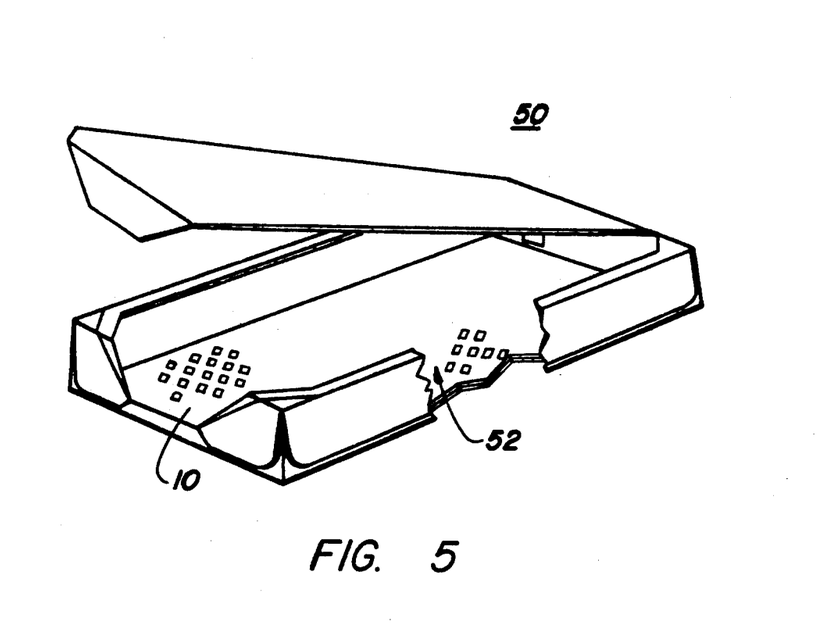
FIG. 5 is a perspective view similar to FIG. 4, of an alternative microwave carton construction of the invention.

FIGS. 4 and 5 illustrate alternative microwave packages, generally designated 40, 50, fabricated of a microwave transparent material which respectively include interior food support panels 42, 52. The support panels are provided with a sheet of the composite susceptor material 10. Packages 40, 50 are preferably fabricated of paperboard, for example, 18 point board, which is coated with a moisture impervious 1 mil covering of low density polyethylene. The sheets of the composite 10 are preferably attached to the interior food support surface package panels 42, 52 by an adhesive. FDA approved polyvinyl acetate adhesives suitable for attaching the composite to the microwave packages are offered by H. B. Fuller Co., Edison, N.J., under the brand designation AIRFLEX 421.

Packages 40, 50 have diverse application for use in packaging frozen foods including breads, baked goods, pizza, fried foods and the like. It will be understood that heat profiles of the composite may be modified as appropriate to accommodate cooking requirements of selected foods.

Figure 6:
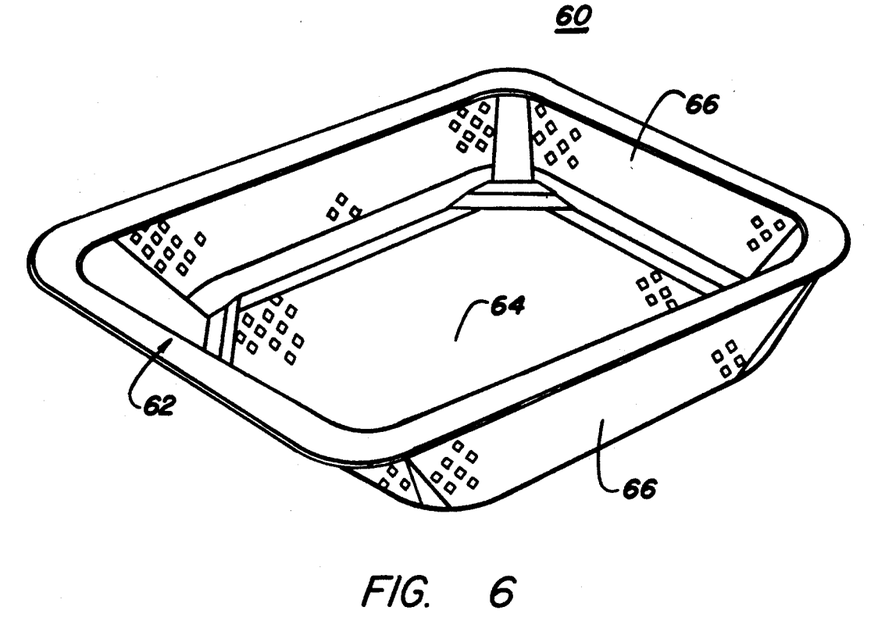
FIG. 6 is a perspective view of an ovenable tray fabricated susceptor material of the invention.
Figure 7:
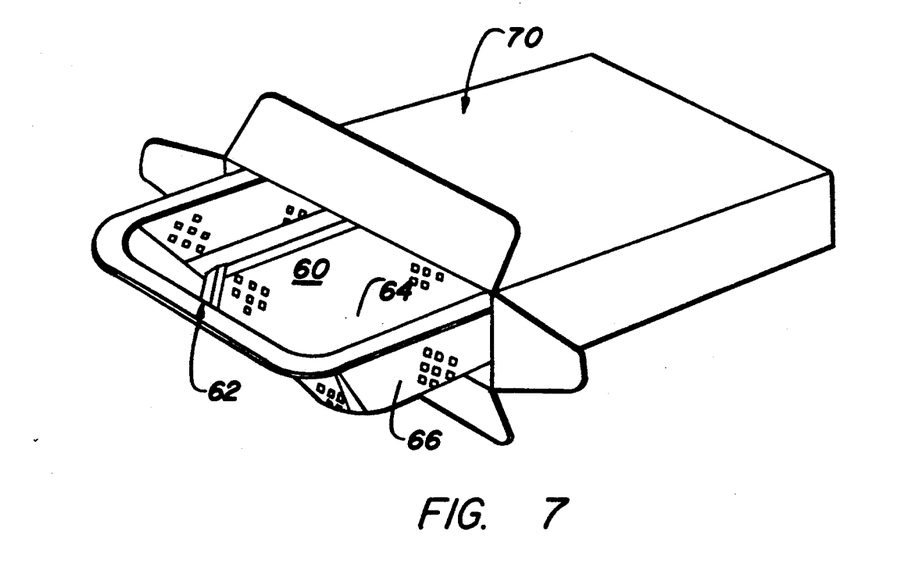
FIG. 7 is a perspective view of the tray of FIG. 6 in combination with an open ended sleeve carton which includes closure panels.

FIG. 6 shows an open ended tray 60 fabricated of the composite material 10 which has application for microwavable frozen food. The tray 60 includes a support frame 62 fabricated of a die cut PET and reinforced with crystalline polyethylene terephthalate (CPET). The support frame supports base 64 and side walls 66 which are fabricated of the composite material 10. FIG. 7 illustrates a preferred packaged system including a paperboard carton, generally designated 70, in combination with the tray 60. An 18 point paperboard of type employed in the embodiments of FIGS. 4 and 5 is suitable for fabricating the carton 60 of this embodiment.

It will be appreciated that package applications of the composite 10 illustrated in the drawings are merely representative of the diverse uses of the composite. Those skilled in the art will recognize that the composite may be utilized in packaging which includes conventional shielding materials to impart controlled heat profiles in product packaging. For example, an aluminum shielding foil may be incorporated in the microwave packages of the invention to obtain distinct temperature zones in a package necessary for particular food items. Similarly, laminated composite sheets employed in the packages 40, 50 and in the tray 60 may include regions in which do not include a susceptor backing layer.

Method of Fabricating the Microwave Composite

Figure 3:
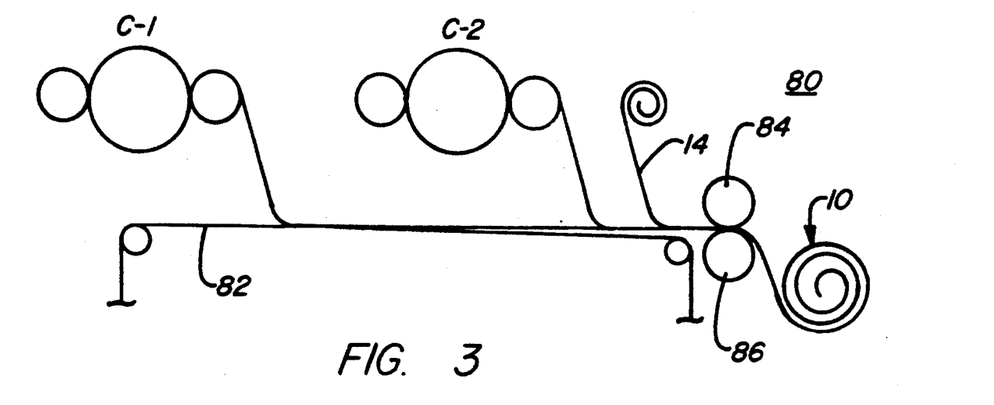
FIG. 3 is a schematic view of a production line including cards and thermal calendering apparatus for production of the micro susceptor material of the invention.

FIG. 3 illustrates a preferred production line for fabrication of the composite 10 of the invention. The line includes conventional apparatus for contact heat and pressure bonding of composite layers 12, 14 including cards C-1 and C-2, and thermal calendering station, generally designated 80.

In accordance with the invention method, a fibrous layer 12 of carded material is advanced on a continuous conveyor belt 82 from cards C-1 and C-2 for combination with a layer of susceptor material 14. The carded and susceptor layers 12, 14 are arranged in surface-to-surface lamina contact and bonded into the integral composite structure at the thermal calendering station 80. Manufacturing economy is effected by bonding the carded fibrous layer 12 to the polymeric susceptor layer 14 in a "one-pass" operation without use of adhesives.

Effective bonding of the composite is obtained in the invention by employing a two calender roll thermal bonding system. With reference to FIG. 3, rollers designated 84, 86 are heated calendering rolls which are disposed in pressure contact. Composite layers 12, 14 are passed between the rollers under heat and pressure to effect a uniform bonding in the composite.

Figure 3A:
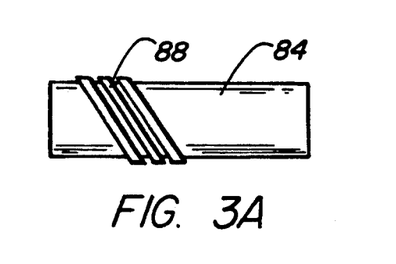
FIGS. 3A and B are plan views of engraved calendar rolls employed in the production line of FIG. 3.
Figure 3B:
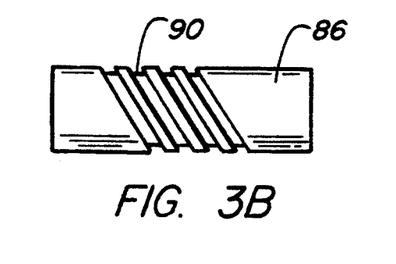
Figure 3C:
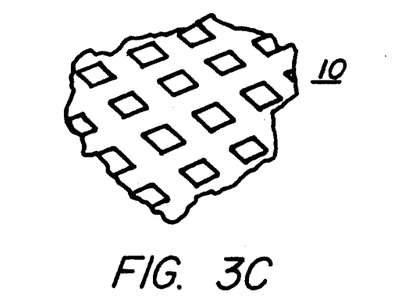
FIG. 3C illustrates a plan segmented view of a pattern imparted to a composite material processed on the production line of FIG. 3.

FIGS. 3A and B illustrate engraved spiral calender surface patterns 88, 90 which may be employed in calender rolls 84, 86. A diamond pattern of the composite, illustrated in FIG. 3C, is obtained by arrangement of the spiral engravings of rolls 88, 90 on cross-biased orientation in the calendering process line.

Table III sets forth processing parameters for selected composite materials of the invention.

TABLE III

| Sample: | Composite Materials and Process Conditions | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Fiber | PET | PET | PET | 20/80% PET/Rayon | PET | PET | PET | 80/20% PET/Rayon | PET | PET | PET | PET | PET |
| Film Thickness (mil PET) | .96 | .96 | .96 | .96 | .96 | .48 | .48 | .48 | .96 | .96 | .96 | .48 | .48 |
| Optical Density | .18 | .18 | .18 | .18 | .18 | .18 | .18 | .18 | .20 | .20 | .14 | .25 | .30 |
| Cal. Pattern (Bond spots/inch) | 59 | 230 | 59 | 59 | 59 | 59 | 59 | — | 59 | 59 | 59 | 59 | 59 |
| Line speed (feet/min) | 30 | 100 | 30 | 30 | 100 | 30 | 75 | 75 | 75 | 75 | 75 | 100 | 50 |
| Cal. Temp. (°F.) | 437 | 402 | 430 | 330 | 440 | 440 | 415 | 415 | 420 | 440 | 440 | 440 | 460 |
| Cal. Press (psi) | 9600 | 13600 | 2100 | 3900 | 9600 | 6400 | 4600 | 4600 | 9600 | 5400 | 5400 | 9600 | 5400 |
| Microwave Heat-up (30 sec.-°F.) | 350 | 265 | 330 | 300 | 336 | 310 | — | — | 357 | 365 | 230 | 264 | 300 |
| Grease Absorption (Grams fluid/gram sample) | 1.2 | 2.2 | 2.2 | 2.5 | — | — | 3.7 | 6.3 | — | — | — | — | — |

From the foregoing, it will be recognized that the numerous modifications in the practice of the invention are possible in light of the above disclosure. For example, although a metallized microwave susceptor layer 14 is disclosed in the preferred embodiment, non-metallized susceptor materials are within the scope of the invention. Similarly, although the absorbent layer 12 of the composite is preferably a carded nonwoven material, other nonwoven web structures and woven fabrics may be employed in the invention.

It should also be understood that the thermal calendering system illustrated in the drawings is merely representative of a preferred "heat and pressure" system. Other systems, such as ultrasonic bonding, have application in the invention.

The preferred composite 10 includes a uniform pattern of bond regions. Composite structures including polymeric strata layers which are bonded over their entire surface areas are encompassed within the invention. Accordingly, bonding may be effected employing embossed and nonembossed calender rolls and combinations thereof. Similarly, bonding specifications may be varied to meet material specification requirements. For example, strength in the composite may be enhanced by employing additional calender rolls and processing.

Therefore, although the invention has been described with reference to certain preferred embodiments, it will be appreciated that other composite structures and processes for their fabrication may be devised, which are nevertheless within the scope and spirit of the invention as defined in the claims appended hereto.

We claim:

1. An absorbent microwave susceptor composite material which comprises:

a first layer of polymeric fibrous material which includes thermoplastic fibers and has absorbent properties for absorbing fluids, and a second layer of thermoplastic polymer material and microwave susceptor material having microwave susceptive characteristics for microwave cooking of food, said thermoplastic fibers and said thermoplastic polymer material of said first and second layers respectively having thermal softening temperatures in the range of 250° F. to 500° F., said first and second layers being arranged in lamina surface-to-surface contact and being thermal bonded together into an integral structure by application of heat and pressure bonding said thermoplastic fibers of said first layer with said thermoplastic polymer material of said second layer, whereby said integral structure has a combination of the microwave susceptive characteristics of said second layer for microwave cooking of food and absorbent properties of said first layer for absorbing fluids emanating from the cooking of food by said second layer.

2. An absorbent microwave susceptor material according to claim 1, wherein said first layer includes polymeric fibers having a basis weight in range of 30 to 100 grams/yd$^2$, said polymeric fibers having lengths in range of 1 to 3 inches, and denier of 1.2 to 6, and said second layer has a capacity to impart a temperature to the susceptor composite in the range of 300° to 500° F. when subjected to microwave energy.

3. An absorbent microwave susceptor material according to claim 2, wherein said first and second layers are uniformly bonded together across their entire surface-to-surface interfaces at discrete bond regions.

4. An absorbent microwave susceptor material according to claim 3, wherein said first and second layers are bonded by thermal calendering at a nip temperature and pressure, respectively, in range of 330° F. to 490° F. and 2100 to 21,000 psi.

5. An absorbent microwave susceptor material according to claim 4, wherein said discrete bond regions are present in a density of approximately 50/in$^2$ and occupy approximately 25 percent of material surface area.

6. An absorbent microwave susceptor material according to claim 4, wherein said first layer includes polyethylene terephthalate (PET) fibers, and said second layer includes a substrate of polyethylene terephthalate (PET) film, and a susceptor stratum of an elemental metal material, said second layer having a gauge and optical density, respectively, in the ranges of 48 to 96, and 0.15 to 0.32.

7. An absorbent microwave susceptor material according to claim 6, wherein said film substrate and said susceptor stratum, respectively, include outer susceptor and film surfaces, and said film substrate is arranged in surface-to-surface contact with said first layer of PET fibers.

8. An absorbent microwave susceptor material according to claim 7, wherein said discrete bond regions are present in a density of approximately 59/in$^2$ and occupy approximately 25 percent of material surface area.

9. An absorbent microwave susceptor material according to claim 8, wherein said discrete bond areas have a diamond configuration.

10. An absorbent microwave susceptor material according to claim 6, wherein said film substrate and said susceptor stratum, respectively, include outer susceptor and film surfaces, and said susceptor stratum is arranged in surface-to-surface contact with said first layer of PET fibers.

11. An absorbent microwave susceptor material according to claim 10, said film substrate includes perforations.

12. An absorbent microwave susceptor material according to claim 11, wherein said discrete bond regions are present in a density of approximately 59/in$^2$ and occupy approximately 25 percent of material surface area.

13. An absorbent microwave susceptor material according to claim 12, wherein said discrete bond areas have a diamond configuration.

14. A microwave package which comprises:

an enclosure fabricated of a material which is substantially transparent to microwaves, said enclosure including an interior surface, and an absorbent microwave susceptor material disposed within said enclosure, said absorbent microwave susceptor material comprising:

a first layer of polymeric fibrous material which includes thermoplastic fibers and has absorbent properties for absorbing fluids, and a second layer of thermoplastic polymer material and microwave susceptor material having microwave susceptive characteristics for microwave cooking of food, said thermoplastic fibers and said thermoplastic polymer material of said first and second layers respectively having thermal softening temperatures in the range of 250° F. to 500° F.

said first and second layers being arranged in lamina surface-to-surface contact and being thermal bonded together into an integral structure by application of heat and pressure bonding said thermoplastic fibers of said first layer with said thermoplastic polymer material of said second layer, whereby said integral structure has a combination of the microwave susceptive characteristics of said second layer for microwave cooking of food and absorbent properties of said first layer for absorbing fluids emanating from the cooking of food by said second layer.

15. A microwave package according to claim 14, wherein said first layer includes polymeric fibers having a basis weight in range of 30 to 100 grams/yd$^2$, said polymeric fibers having lengths in range of 1 to 3 inches, and denier of 1.2 to 6, and said second layer has capacity to impart a temperature to the susceptor composite in the range of 300° to 500° F. when subjected to microwave energy.

16. A microwave package according to claim 15, wherein said first and second layers are uniformly bonded together across their entire surface-to-surface interfaces at discrete bond regions.

17. A microwave package according to claim 16, said first layer includes polyethylene terephthalate (PET) fibers, and said second layer includes a substrate of polyethylene terephthalate (PET) film, and a susceptor stratum of an elemental metal material, said second layer having a gauge and optical density, respectively, in the ranges of 48 to 96, and 0.15 to 0.32.

18. A microwave package according to claim 14, wherein said microwave interactive material is attached to said interior surface.

19. A microwave package according to claim 17, wherein said microwave interactive material is attached to said interior surface.

20. A microwave package according to claim 14, wherein said microwave interactive material is configured to define an open ended tray.

21. A microwave package according to claim 20, wherein said tray includes a structural support frame.

22. A microwave package according to claim 21, wherein said first and second layers are bonded in discrete regions to impart a patterned configuration to said microwave interactive material.

23. A microwave package according to claim 22, wherein said structural support frame is fabricated of a PET coated paperboard.

24. A microwave package according to claim 23, wherein said PET coated paperboard is reinforced in CPET.

25. A method for fabricating an absorbent microwave susceptor composite material, comprising the steps of:
providing a first layer of polymeric fibrous material which includes thermoplastic fibers and has absorbent properties for absorbing fluids, and second layer of thermoplastic polymer material and microwave susceptor material having microwave susceptive characteristics for microwave cooking of food,
arranging said first and second layers in lamina surface-to-surface contact, and
thermally bonding said first and second layers into an integral structure by application of heat and pressure through bonding said thermoplastic fibers of said first layer with said thermoplastic polymer material of said second layer, whereby said integral structure has a combination of the microwave susceptive characteristics of said second layer for microwave cooking of food and absorbent properties of said first layer for absorbing fluids emanating from the cooking of food by said second layer.

26. The method of claim 25, wherein said second layer includes a metallized susceptor film component which is microwave interactive.

27. The method of claim 26, wherein said first layer includes carded web of polymeric fibers have a basis weight in range of 30 to 100 grams/yd$^2$, said polymeric fibers having lengths in range of 1 to 3 inches, and deniers of 1.2 to 6, and said metallized susceptor film has a capacity to impart a temperature to the susceptor material in the range of 300° to 500° F. when subjected to microwave energy.

28. The method of claim 27, wherein said first and second layers are uniformly bonded together by thermal calendaring in one pass across their entire surface-to-surface interfaces at discrete bond regions.

29. The method of claim 28, wherein said first and second layers are bonded by thermal calendering at a nip temperature and pressure, respectively, in range of 410° F. to 460° F and 4,000 to 10,000 psi.

30. The method of claim 29, wherein said discrete bond regions are present in a density of approximately 59/in$^2$ and occupy approximately 25 percent of material surface area.

31. The method of claim 30, wherein said first layer includes polyethylene terephthalate (PET) fibers, and said second layer includes metallized PET susceptor film having a gauge and optical density, respectively, of 92 and 0.22±0.03.

32. The method of claim 30, wherein said first layer includes polyethylene terephthalate (PET) fibers, and said second layer includes metallized PET susceptor film having a gauge and optical density, respectively, of 48 and 0.22±0.03.

* * * * *